United States Patent Office 3,709,885
Patented Jan. 9, 1973

---

3,709,885
1-(m-TRIFLUOROMETHYLPHENYL)-4 - (N-ALKYL-N-ALKOXY)-AMINO-5-HALO-PYRIDAZONE-(6)
Cuno Ebner, Reinach, and Max Schuler, Arlesheim, Switzerland, assignors to Sandoz Ltd. (also known as Sandoz KG), Basel, Switzerland
No Drawing. Filed Dec. 14, 1970, Ser. No. 98,123
Claims priority, application Switzerland, Dec. 19, 1969, 18,917/69
Int. Cl. C07d 51/04
U.S. Cl. 260—250 A                     3 Claims

ABSTRACT OF THE DISCLOSURE

The invention concerns novel pyridazone compounds of the formula:

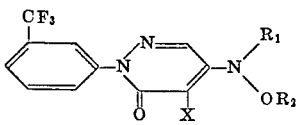

wherein $R_1$ and $R_2$ are each alkyl of 1 to 4 carbon atoms, and X is halogen.

Processes for the production of the compounds are also described. The compounds have useful herbicidal activity.

---

The present invention relates to new pyridazone compounds of Formula I,

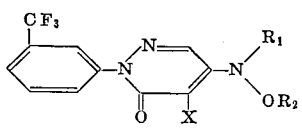

wherein $R_1$ and $R_2$ are each alkyl of 1 to 4 carbon atoms, and X is halogen.

The compounds have herbicidal properties.

The compounds of Formula I may be obtained by
(a) Reacting in the presence of a base, a compound of Formula IIa,

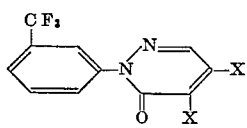

wherein X is as defined above,
with a compound of Formula III,

wherein $R_1$ and $R_2$ are as defined above, or
(b) Alkylating in the presence of a base, a compound of Formula IIb,

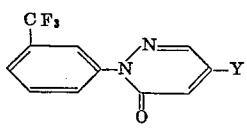

wherein Y is —NHOH, —NHOR$_2$ or

wherein $R_1$ and $R_2$ are as defined above.

The compounds of Formula IIb may be produced by reacting in the presence of a base, a compound of Formula IIa with a compound of Formula IV,

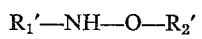

$$R_1'—NH—O—R_2'  \qquad IV$$

wherein $R_1'$ and $R_2'$ are each hydrogen or alkyl of 1 to 4 carbon atoms, provided that when $R_1'$ is alkyl, then $R_2'$ is hydrogen.

The production of the compounds of Formula I may be effected as follows:

In accordance with process (a) the compound of Formula IIa may be reacted with the compound of Formula III, in the presence of a base, e.g. triethyl amine, in an inert solvent, e.g. acetonitrile, dimethyl formamide or water, for about 6 to 48 hours, at a temperature between 80° and 150° C. After reaction, the reaction solution may be worked up in conventional manner.

In accordance with process (b) the compound of Formula IIb may be alkylated in an inert solvent, e.g. acetonitrile, acetone, water, mixtures of water and a water-miscible organic solvent, at a temperature between room temperature and 40° C., with a dialkyl sulphate in the presence of a base, e.g. triethyl amine, caustic soda solution or sodium carbonate. The reaction solution may be worked up in conventional manner.

The alkylation of process (b) may, for example, be effected with a dialkyl sulphate.

In the production of a compound of Formula IIb, a compound of Formula IIa is reacted with a compound of Formula IV in an inert solvent, e.g. acetonitrile, dimethyl formamide or water, in the presence of a base, e.g. triethyl amine or sodium carbonate, at a temperature between 80° and 150° C., for 2 to 48 hours.

The starting materials required for process (a) and in the production of a compound of Formula IIb, used as starting materials in process (b), are known or may be prepared in known manner.

The compounds of Formula I of the invention are useful herbicides, as for example indicated by their effectiveness against *Plantago lanceolata*, *Capsella bursa pastoris*, *Echinochloa crus-galli*, *Stellaria media*, *Senecio vulgaris*, and also against undesired grasses such as *Aleopecurus pratensis*.

The compounds of Formula I are furthermore useful selective herbicides in cotton and beet crops. Thus, cotton and beet are not significantly damaged by the use of the compounds of Formula I at the doses at which undesired plant growth is destroyed.

The compounds of Formula I may most conveniently be employed in admixture with conventional diluents and carrier materials. The active agent may be applied to the soil or to the weeds with the aid of conventional applicator equipment. They may be applied to the locus before or after emergence of the weeds. The active agents may be formulated into suspensions, emulsions, pastes and granulates, and may then be diluted to the desired concentration before use.

The production of formulations is effected in known manner by intimately mixing and grinding the compounds of Formula I with suitable carrier materials, optionally with the addition of dispersing agents or solvents which are inert to the active agents.

In order to produce compositions which can be applied in solid forms, such as dusting agents, strewing agents, granulates, etc., the active agents are mixed with solid carriers. Examples of carriers which may be used are caolin, talc, chalk, limestone, cellulose powder, etc.

Substances improving adhesion on plants and plant parts and/or giving a better wettability or dispersibility may also be added to the mixtures.

Spraying powders are obtained by mixing and grinding the active agents with pulverulent carrier materials until the mixture is homogeneous. The substances mentioned for the solid application forms may, for example, be used as carriers.

In order to produce solutions, the active agent or several active agents of Formula I are dissolved in suitable organic solvents or solvent mixtures. Examples of suitable solvents are ketones such as acetone, alcohols, hydrocarbons, alkyl naphthalenes, alone or in admixture.

For special purposes the new compounds of Formula I may also be combined with suitable known herbicides, or may be used as a mixture with the same.

The active agent formulations may, for example, contain between 2 and 90 percent, preferably between 2 and 80 percent by weight of active agent. The application forms may, for example, contain between 0.01 and 10 percent by weight of active agent.

The compounds of Formula I may be used as herbicides or as selective herbicides in cotton and beet crops at doses of between about 1 and 10 kg./hectare, depending on the compound employed and the particular effect desired.

The following examples are illustrative of particular application forms of the compounds and are not in any way intended to limit the scope of the invention.

Example a 25 parts of 1-(m-trifluoromethylphenyl)-4-(N-methyl-N-methoxy)-amino-5-chloro-pyridazone-(6), 5 parts of a condensation product from formaldehyde and naphthalene sulphonate, 2 parts of alkyl benzene sulphonate, 5 parts of dextrine, 1 part of ammonium caseinate and 62 parts of diatomaceous earth are mixed until a homogeneous mixture is obtained and are then ground until the particles are considerably smaller than 45 microns. The resulting powder may, for example, be used against weeds.

Example b 10 parts of 1-(m-trifluoromethylphenyl)-4-(N-methyl-N-methoxy)-amino-5-chloro-pyridazone - (6) are mixed with 10 parts of isooctyl phenyl decaglycol ether and 80 parts of acetone. The resulting mixture is diluted with water to the desired concentration before use.

The herbicidal effect of the compounds of the invention is illustrated in Table 1.

The evaluations indicated in Table 1 by figures 1 to 9 signify: 1=no destruction, 9=total destruction, whereas the intermediate values given refer to further graduations between the figures on the evaluation scale. The following Table 1 shows the effect of post-emergence treatment with 4 kg. of active agent per hectare.

TABLE 1

Herbicidal effect of 1-(m-trifluoromethylphenyl)-4-(N-methyl-N-methoxy)-amino - 5 - chloro-pyridazone - (6) against—

| | |
|---|---|
| Plantago lanceolata | 9 |
| Capsella bursa-pastoris | 9 |
| Echinochloa crus-galli | 8 |
| Brassica oleracea | 9 |
| Stellaria media | 9 |
| Senecio vulgaris | 9 |
| Alopecurus pratensis | 9 |
| Alopecurus myosuroides | 8 |
| Cotton | 1 |
| Beet | 1 |

In cotton and carrot cultures a selective herbicidal effect is exhibited. In addition a selective effect in corn was found.

The following examples illustrate the production of the compounds of Formula I of the invention, but in no way limit the scope thereof. The temperatures are indicated in degrees centigrade.

EXAMPLE 1

Production of 1-(m-trifluoromethylphenyl)-4-(N-methyl-N-methoxy)-amino-5-chloro-pyridazone-(6)

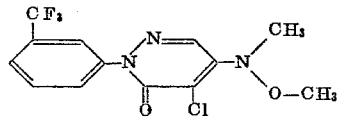

30.9 g. (0.1 mol) of 1-(m-trifluoromethylphenyl)-4,5-dichloro-pyridazone-(6) are dissolved in 100 cc. of dimethyl formamide. After the addition of 10.73 g. (0.11 mol) of O,N-dimethylhydroxylamine hydrochloride and 21.21 g. (0.21 mol) of triethyl amine, the reaction mixture is heated to 80° for 24 hours. After precipitation with water, the precipitate is filtered off and recrystallized from alcohol. White crystals, having a M.P. of 109–111°, are obtained.

*Analysis.*—$C_{13}H_{11}ClF_3N_3O_2$ Molecular weight: 333.7. Calculated (percent): C, 46.8; H, 3.3; N, 12.6. Found (percent): C, 46.7; H, 3.4; N, 12.7.

EXAMPLE 2

Production of 1-(m-trifluoromethylphenyl)-4-(N-methyl-N-methoxy)-amino-5-bromo-pyridazone-(6)

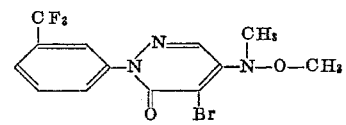

39.8 g. (0.1 mol) of 1-(m-trifluoromethylphenyl)-4,5-dibromo-pyridazone-(6) are dissolved in 100 cc. of dimethyl formamide. After the addition of 20.5 g. (0.21 mol) of O,N-dimethylhydroxylamine hydrochloride and 31.3 g. (0.31 mol) of triethyl amine, the reaction mixture is heated to 80° for 24 hours. After precipitation with water, the precipitate is filtered off and recrystallized from alcohol. White crystals having a M.P. of 111–112° are obtained.

*Analysis.*—$C_{13}H_{11}BrF_3N_3O_2$ Molecular weight: 378.15. Calculated (percent): C, 41.3; H, 2.9; N, 11.1. Found (percent): C, 41.5; H, 3.0; N, 11.1.

What is claimed is:
1. A compound of the formula:

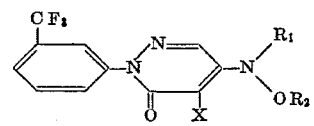

wherein $R_1$ and $R_2$ are each alkyl of 1 to 4 carbon atoms, and X is chloro or bromo.

2. The compound of claim 1, which is 1-(m-trifluoromethylphenyl) - 4 - (N - methyl - N - methoxy)-amino-5-chloro-pyridazone-(6).

3. The compound of claim 1, which is 1-(m-trifluoromethylphenyl) - 4 - (N - methyl - N - methoxy) - amino-5-bromo-pyridazone-(6).

References Cited

UNITED STATES PATENTS 3,045,014   7/1962   Hensel _____ 260—250 A

FOREIGN PATENTS 656,228   8/1951   Great Britain.

NICHOLAS S. RIZZO, Primary Examiner

U.S. Cl. X.R.

71—92

UNITED STATES PATENT OFFICE
CERTIFICATE OF CORRECTION

Patent No. 3,709,885   Dated January 9, 1973

Inventor(s) Cuno Ebner and Max Schuler

It is certified that error appears in the above-identified patent and that said Letters Patent are hereby corrected as shown below:

Column 1 line 60   delete the formula and insert the following formula:

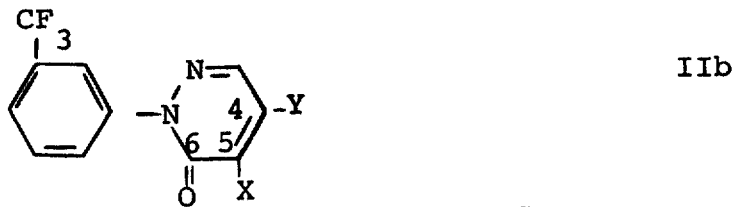

IIb wherein Y is -NHOH, -NHOR$_2$ or -N$\langle$ R$_1$ / OH, wherein X, R$_1$ and R$_2$ are as defined above.

Signed and Sealed this

Second Day of November 1976

[SEAL]

Attest:

RUTH C. MASON
Attesting Officer

C. MARSHALL DANN
Commissioner of Patents and Trademarks